(12) United States Patent
Yamaguchi

(10) Patent No.: US 10,289,074 B2
(45) Date of Patent: May 14, 2019

(54) CONTROLLER INCLUDING MEANS FOR CONFIRMATION IN PREPARATION OF SYNCHRONOUS OPERATION TEACHING DATA

(71) Applicant: FANUC Corporation, Yamanashi (JP)

(72) Inventor: Takehiro Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 48 days.

(21) Appl. No.: 15/367,119

(22) Filed: Dec. 1, 2016

(65) Prior Publication Data

US 2017/0160705 A1    Jun. 8, 2017

(30) Foreign Application Priority Data

Dec. 2, 2015 (JP) .................. 2015-235877

(51) Int. Cl.
*G05B 19/404* (2006.01)
*G05B 13/02* (2006.01)
*G05B 19/427* (2006.01)
*G05B 19/402* (2006.01)

(52) U.S. Cl.
CPC ....... *G05B 13/0265* (2013.01); *G05B 19/427* (2013.01); *G05B 19/402* (2013.01); *G05B 2219/36039* (2013.01); *G05B 2219/42191* (2013.01); *G05B 2219/43203* (2013.01)

(58) Field of Classification Search
CPC .............. G05B 13/0265; G05B 19/427; G05B 19/402; G05B 2219/36039; G05B 2219/42191
See application file for complete search history.

(56) References Cited

U.S. PATENT DOCUMENTS

| 5,007,027 A | * | 4/1991 | Shimoi | ............. G06F 1/30 365/229 |
| 2007/0213873 A1 | * | 9/2007 | Ban | ........... B25J 9/1656 700/245 |
| 2013/0011220 A1 | * | 1/2013 | Jacobsen | ........... B25J 3/04 414/2 |

(Continued)

FOREIGN PATENT DOCUMENTS

JP    9-97104 A       4/1997
JP    09300256 A   *  11/1997

(Continued)

OTHER PUBLICATIONS

Office Action in JP Application No. 2015-235877, dated Dec. 19, 2017, 5 pp.

*Primary Examiner* — Miranda M Huang
*Assistant Examiner* — Brian T McMenemy
(74) *Attorney, Agent, or Firm* — Hauptman Ham, LLP

(57) ABSTRACT

A controller teaches a teaching point of a slave axis corresponding to a master axis so as to perform a synchronous operation. The controller calculates a teaching range based on one moving speed pattern selected from a plurality of moving speed patterns of the master axis which are preliminarily registered, a preliminarily-set allowable speed in an operation of the slave axis, and a calculated teaching range, in which teaching can be performed, of a following teaching point, so as to display the teaching range on a display device.

20 Claims, 5 Drawing Sheets

(56) References Cited

U.S. PATENT DOCUMENTS

| | | | | |
|---|---|---|---|---|
| 2014/0012419 A1* | 1/2014 | Nakajima | ............... | B25J 9/1633 |
| | | | | 700/261 |
| 2016/0023355 A1* | 1/2016 | Komatsu | ................ | B25J 9/1682 |
| | | | | 700/248 |
| 2016/0082545 A1* | 3/2016 | Kurokawa | ............. | B23K 26/00 |
| | | | | 700/166 |

FOREIGN PATENT DOCUMENTS

| | | | |
|---|---|---|---|
| JP | 2009-262306 A | | 11/2009 |
| JP | 2013-59852 A | | 4/2013 |
| JP | 2014-172159 A | | 9/2014 |
| JP | 2014217913 A | * | 11/2014 |

\* cited by examiner

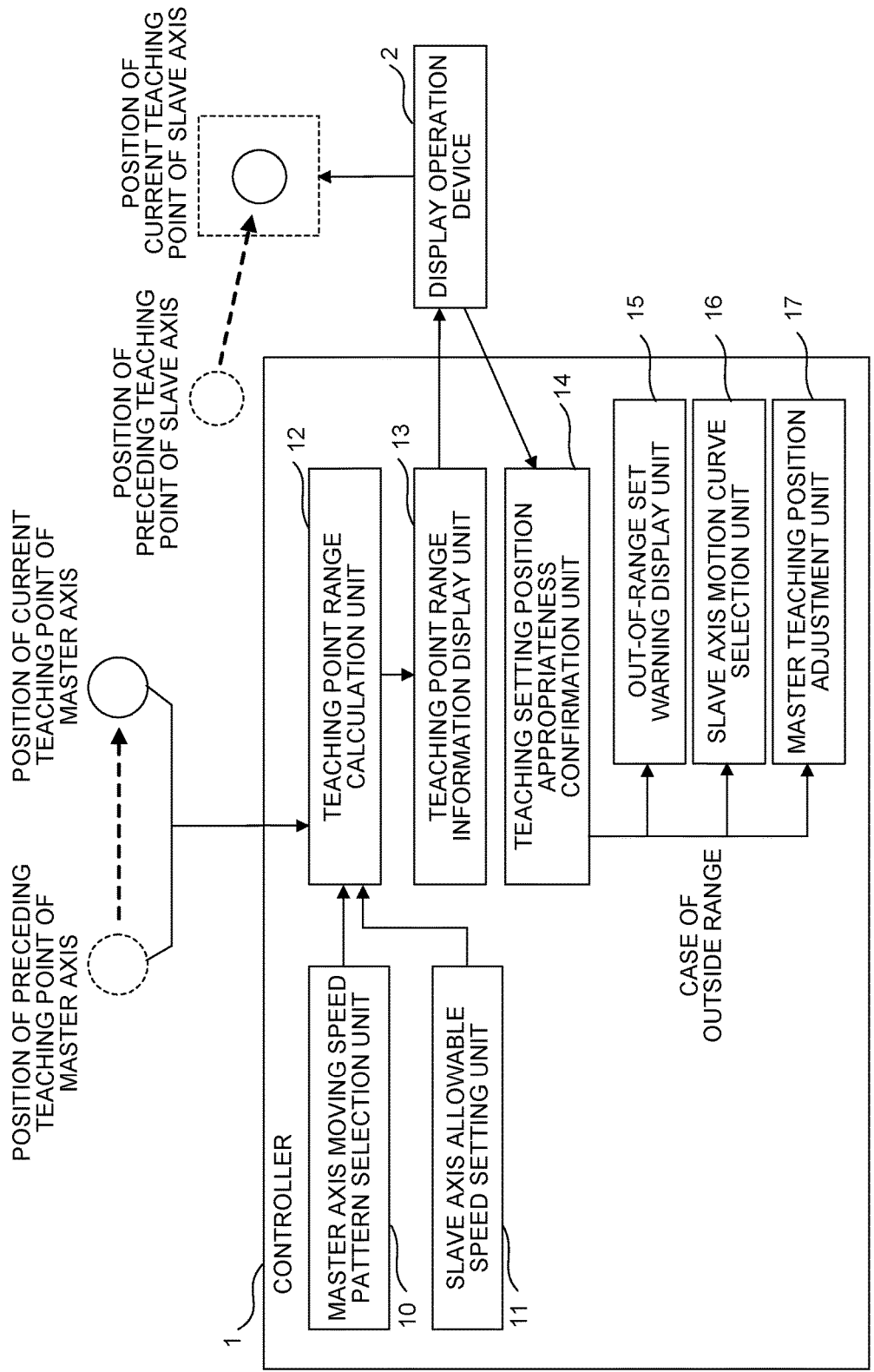

MASTER AXIS MOVING SPEED PATTERN
(UNIT: mm/sec)

|    |    |    |    |    |    |    |    |    |    |
|----|----|----|----|----|----|----|----|----|----|
|    |    |    |    |    |    |    |    |    |    |
|    |    | 30 | 30 |    |    |    |    |    |    |
|    | 20 |    |    | 20 | 20 | 20 |    |    |    |
| 10 |    |    |    |    |    |    | 10 | 10 | 10 |

SLAVE AXIS ALLOWABLE SPEED PATTERN
(UNIT: mm/sec)

| 100 | 100 | 200 | 200 | 300 | 100 | 100 | 500 | 200 | 100 |
|-----|-----|-----|-----|-----|-----|-----|-----|-----|-----|

| SHAPE OF CURVE | MEANING |
|---|---|
| HALT | AXIS HALT |
| CONSTANT SPEED | STRAIGHT LINE |
| ACCELERATION | EXPONENTIAL FUNCTION |
| SIMPLE HARMONIC | CURVE OF CONSTANT SPEED CIRCULAR MOTION |

| INTERFERENCE CASE | RANGE OF MASTER AXIS | RANGE OF SLAVE AXIS 1 | RANGE OF SLAVE AXIS 2 |
|---|---|---|---|
| CASE 1 | 0~10 | 0~10 | 5~10 |
| CASE 2 | 180~190 | 40~50 | -10~0 |
| CASE 3 | 250~270 | 30~40 | 10~20 |
| ... | ... | ... | ... |

SLAVE AXIS SPEED CURVE

SLAVE AXIS ALLOWABLE SPEED PATTERN
(UNIT: mm/sec)

| 10 | 10 | 10 | 50 | 50 | 50 | 10 | 10 | 10 |
|---|---|---|---|---|---|---|---|---|

CONTROLLER INCLUDING MEANS FOR CONFIRMATION IN PREPARATION OF SYNCHRONOUS OPERATION TEACHING DATA

RELATED APPLICATIONS

The present application claims priority to Japanese Patent Application Number 2015-235877, filed Dec. 2, 2015, the disclosure of which is hereby incorporated by reference herein in its entirety.

BACKGROUND OF THE INVENTION

1. Field of the Invention

The present invention relates to a controller, and especially relates to a controller which shortens time required for teaching of a slave axis.

2. Description of the Related Art

In a case where control for making a slave axis perform a certain operation in a manner to allow the slave axis to follow a motion of a master axis is performed, a position of the slave axis corresponding to each position of the master axis is set by teaching. In this case, when an operation is actually performed after carrying out teaching of a position of the slave axis, a speed of the slave axis that follows the master axis changes in accordance with a motion pattern of the master axis. However, the speed of the slave axis is sometimes excessively increased depending on a motion pattern of the master axis. In this case, it is necessary to perform a setting operation again by carrying out teaching of the position of the slave axis again, which results in increases of a time spent for teaching. Further, the speed change of the slave axis based on the motion pattern of the master axis generates such state that the slave axis cannot perform a smooth following operation to degrade operation accuracy, as well.

As one of means for solving these problems, a technique is known in Japanese Patent Application Laid-Open No. 2014-172159 in which when teaching is carried out while operating a conveyer in a conveying speed for teaching time which is slower than a conveying speed for an actual operation time of the conveyer, the maximum conveyable speed of the conveyer when a robot performs an actual operation based on a taught trajectory of the robot is calculated so as to display the maximum conveyable speed of the conveyer on a display unit.

However, in the above-mentioned technique disclosed in Japanese Patent Application Laid-Open No. 2014-172159, speed excess of the slave axis can be grasped only based on a speed notified after teaching, so there is a problem that teaching of the slave axis has to be repeatedly carried out to find a teaching point on which speed excess does not occur.

SUMMARY OF THE INVENTION

An object of the present invention is to provide a controller which preliminarily notifies a teaching range, in which speed excess of the slave axis does not occur, so as to enable shortening of time required for teaching of the slave axis.

A controller according to the present invention is configured to teach a teaching point of one or more slave axes corresponding to a master axis so as to perform a synchronous operation and includes: a master axis moving speed pattern selection unit that selects a moving speed pattern of the master axis that is preliminarily registered; a slave axis allowable speed setting unit that preliminarily sets an allowable speed in an operation of the slave axis; a teaching point range calculation unit that calculates a teaching range of a following teaching point in which teaching can be performed; and a teaching point range information display unit that displays, on a display device, the teaching range calculated by the teaching point range calculation unit. The teaching point range calculation unit is configured to calculate the teaching range based on the moving speed pattern of the master axis that is selected by the master axis moving speed pattern selection unit, the allowable speed in an operation of the slave axis that is set by the slave axis allowable speed setting unit, and positions of past teaching points of the master axis and the slave axis.

The controller may further include: a teaching setting position appropriateness confirmation unit that determines whether or not a position of a teaching point of the slave axis that is set by an operator is within the teaching range calculated by the teaching point range calculation unit; an out-of-range set warning display unit that displays a warning message when the teaching setting position appropriateness confirmation unit determines that a position of a teaching point of the slave axis is a position outside the teaching range; a slave axis motion curve selection unit that is configured to change a shape of a motion curve of the slave axis when the teaching setting position appropriateness confirmation unit determines that the set position of the teaching point of the slave axis is a position outside the teaching range; and a master teaching position adjustment unit that moves the master axis to a position where a speed of the slave axis is in an allowable range, when the teaching setting position appropriateness confirmation unit determines that the set position of the teaching point of the slave axis is a position outside the teaching range.

The teaching point range calculation unit may monitor a position of the master axis, and carries out calculation of the teaching range again when the master axis moves.

The teaching point range calculation unit may be configured to store positions of the master axis and the slave axis in a memory which is backed up by a battery even when the controller is turned off in a middle of an operation, so as to enable teaching operation to be carried out from a halt point when the controller is turned on again.

The teaching setting position appropriateness confirmation unit may use an interference danger range of the master axis and the slave axis in determination of whether or not to be in a range represented by the teaching range.

The out-of-range set warning display unit may be configured to display a warning message and also interlock movements of the master axis and the slave axis to prevent the axes from moving.

The slave axis motion curve selection unit may be configured to newly set a type of a motion curve which is selectable.

The master teaching position adjustment unit may be configured to apply a torque limit to the master axis or display a warning message when moving the master axis.

According to the present invention, when a synchronous motion of a slave axis with respect to a position of a master axis is set by teaching, the motion of the slave axis is confirmed by an actual operation after the teaching operation, and an operation for redoing the teaching operation in a case where speed excess occurs can be eliminated, being able to reduce the number of steps related to the teaching setting operation.

BRIEF DESCRIPTION OF THE DRAWINGS

The forgoing and other objects and feature of the invention will be apparent from the following description of preferred embodiments of the invention with reference to the accompanying drawings, in which:

FIG. 1 is a schematic block diagram illustrating a controller according to an embodiment of the present invention;

DETAILED DESCRIPTION OF THE PREFERRED EMBODIMENT

Figures 2A, 2B, 3:
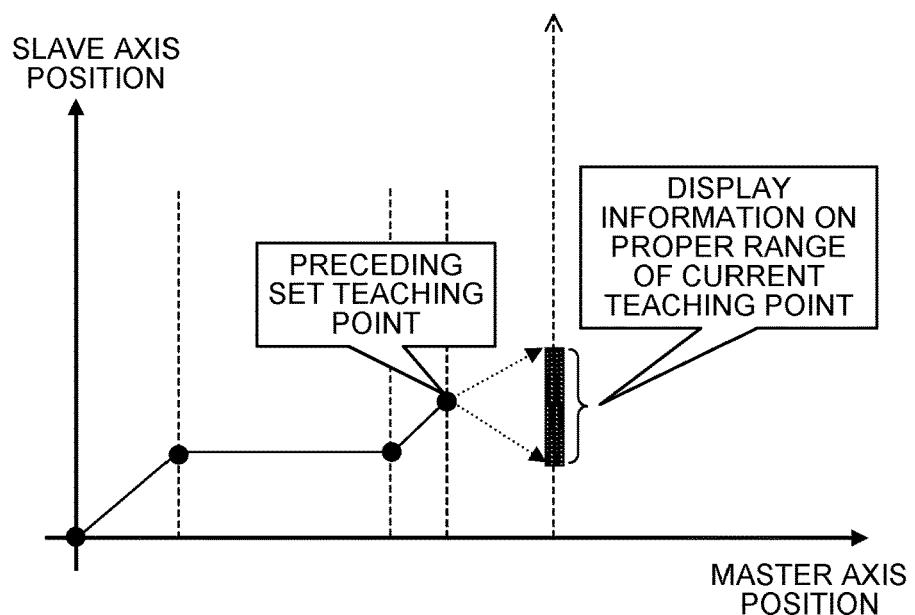
FIG. 2A illustrates an example of a master axis moving speed pattern.
FIG. 2B illustrates an example of a slave axis allowable speed pattern.
FIG. 3 illustrates an example of a range of a teaching point with respect to a display operation device.

FIG. 1 is a schematic block diagram illustrating a functional means of a controller according to an embodiment of the present invention.

A controller 1 includes a master axis moving speed pattern selection unit 10, a slave axis allowable speed setting unit 11, a teaching point range calculation unit 12, a teaching point range information display unit 13, a teaching setting position appropriateness confirmation unit 14, an out-of-range set warning display unit 15, a slave axis motion curve selection unit 16, and a master teaching position adjustment unit 17. Further, the controller 1 is configured to be capable of receiving a teaching point setting operation from an operator and further, configured to be capable of communicate with a display operation device 2 which displays information on a range of a teaching point which can be set with respect to the slave axis.

The master axis moving speed pattern selection unit 10 selects one master axis moving speed pattern related to motion of the master axis which serves as a reference of a teaching operation, from among a plurality of master axis moving speed patterns which are preliminarily registered in a memory (not shown) of the controller 1, based on an operation or the like of an operator.

An example of a master axis moving speed pattern is illustrated in FIG. 2A. The master axis moving speed pattern can be defined, for example, as data representing a moving speed of the master axis in each operation period. For example, in the master axis moving speed pattern illustrated in FIG. 2A, the master axis increases the speed thereof up to 30 mm/sec in the first three operation periods, maintains the speed (30 mm/sec) in the following two operation periods, and then decreases the speed by 10 mm/sec in every three periods. The master axis moves under speed control performed in accordance with the master axis moving speed pattern selected by the master axis moving speed pattern selection unit 10.

The slave axis allowable speed setting unit 11 preliminarily sets an allowable speed pattern of the slave axis for each operation period of the master axis moving speed pattern selected by the master axis moving speed pattern selection unit 10, based on an operation of an operator so as to store the allowable speed pattern in a memory (not shown) of the controller 1.

An example of a slave axis allowable speed pattern is illustrated in FIG. 2B. The slave axis allowable speed pattern can be defined, for example, as data representing an allowable moving speed of the slave axis for each operation period. For example, in the slave axis allowable speed pattern illustrated in FIG. 2B, the allowable speed of the slave axis is set as 100 to 500 mm/sec for each operation period.

After completion of setting of a slave axis allowable speed pattern performed by the slave axis allowable speed setting unit 11, an operator moves the master axis in sequence in accordance with the selected master axis moving speed pattern and stops the master axis at a position of each teaching point of the master axis, and operates the display operation device 2 to teach (input) a position of a teaching point of the slave axis corresponding to the position of the teaching point of the master axis.

The teaching point range calculation unit 12 calculates a range of a position of a teaching point in which the slave axis can be moved, based on the master axis moving speed pattern selected at the master axis moving speed pattern selection unit 10, the slave axis allowable speed pattern set by the slave axis allowable speed setting unit 11, and a position of a teaching point of the slave axis taught through an operation of the display operation device 2 operated by an operator.

The teaching point range calculation unit 12 refers to the master axis moving speed pattern to acquire a speed from a position of the preceding teaching point of the master axis to a position of the current teaching point and thus calculates moving time Tm of the master axis based on the acquired speed by using the following formula (Formula 2 below). Then, the teaching point range calculation unit 12 calculates, based on the calculated moving time Tm, a range of a position of a teaching point (Formula 4 below) in which the slave axis does not exceed an allowable speed and an allowable acceleration rate set in the slave axis allowable speed pattern.

$$Xm = \frac{1}{2} \times Fm \times Tm \quad (1)$$

$$Tm = \frac{(2 \times Xm)}{Fm} \quad (2)$$

$$Fs = \frac{Xs}{Tm} \leq Fs_{max} \quad (3)$$

$$Xs \leq Fs_{max} \times Tm \quad (4)$$

Where Xm is a moving amount of the master axis, Fm is a speed of the master axis, Tm is moving time of the master axis, Xs is an amount of the slave axis, Fs is a speed of the slave axis, and $Fs_{max}$ is a maximum allowable speed of the slave axis.

Formulas 1 to 4 above are formulas for a case where the master axis moves at a constant speed. In a case where the master axis moves while drawing a curve of a constant speed circular motion, by using the following formulas, moving time Tm of the master axis is calculated based on the speed of the master axis (Formula 8) and a range of a position of a teaching point within the allowable speed and the allowable acceleration rate is calculated based on the moving time of the master axis (Formula 10). Here, in Formulas 5 to 10, Aa denotes a value of an acceleration rate of the master axis at a switching point from a curve to a straight line or from a straight line to a curve.

$$A(t) = \left(1 - \frac{1}{Tm}\right)Aa \quad (5)$$

$$F(t) = \int_m^{Tm} A(t)dt = \left(t - \frac{t^2}{2Tm}\right)Aa \quad (6)$$

$$Xm = \int_m^{Tm} F(t)dt = \frac{Tm^2}{6}Aa \quad (7)$$

$$Tm = \sqrt{\frac{6Xm}{Aa}} \quad (8)$$

$$Fs = \frac{Xs}{Tm} \leq Fs_{max} \quad (9)$$

$$Xs \leq Fs_{max} \times Tm \quad (10)$$

Where Xm is a moving amount of the master axis, Tm is moving time of the master axis, Aa is an acceleration rate of master axis, t is time in motion (range 0 to Tm), A(t) is a function of acceleration rate, F(t) is a function of speed, Xs is a moving amount of slave axis, Fs is a speed of the slave axis, and $Fs_{max}$ is a maximum allowable speed of the slave axis.

The teaching point range information display unit 13 displays, on the display operation device 2, a range of a position of a teaching point, in which the slave axis does not exceed the allowable speed and the allowable acceleration and which is calculated by the teaching point range calculation unit 12.

FIG. 3 illustrates a display example of a range of a position of a teaching point of the slave axis. A range of a position of a teaching point of the slave axis may be displayed by a range of numerals of a coordinate position as well as the display method of FIG. 3.

The teaching setting position appropriateness confirmation unit 14 determines whether or not an inputted position of a current teaching point of the slave axis is within the range of the position of the teaching point of the slave axis which is calculated by the teaching point range calculation unit 12, in which the slave axis does not exceed the allowable speed and the allowable acceleration, based on the position of the current teaching point of the slave axis that an operator has inputted while looking at the range of the position of the teaching point of the slave axis which is displayed by the teaching point range information display unit 13. In a case where the position of the current teaching point of the slave axis which is inputted by an operator is out of the range of the position of the teaching point which is calculated by the teaching point range calculation unit 12, an instruction is issued so as to operate any of the out-of-range set warning display unit 15, the slave axis motion curve selection unit 16, and the master teaching position adjustment unit 17 as appropriate. The unit to be operated among the out-of-range set warning display unit 15, the slave axis motion curve selection unit 16, and the master teaching position adjustment unit 17 may be preliminarily set in a setting region provided in a memory (not shown) of the controller 1 or may be selected by an operator at the start of a teaching operation.

In a case where an operator specifies (teaching setting operation) a point which is out of the range of a position of the teaching point of the slave axis which is calculated by the teaching point range calculation unit 12, as a teaching point, the out-of-range set warning display unit 15 displays a warning message on the display operation device 2.

In a case where an operator specifies (teaching setting operation) a point, which is out of the range of the position of the teaching point of the slave axis which is calculated by the teaching point range calculation unit 12, as a teaching point, the slave axis motion curve selection unit 16 changes a motion curve from the preceding teaching point of the slave axis to the current teaching point based on selection by the operator.

Figures 4, 5:
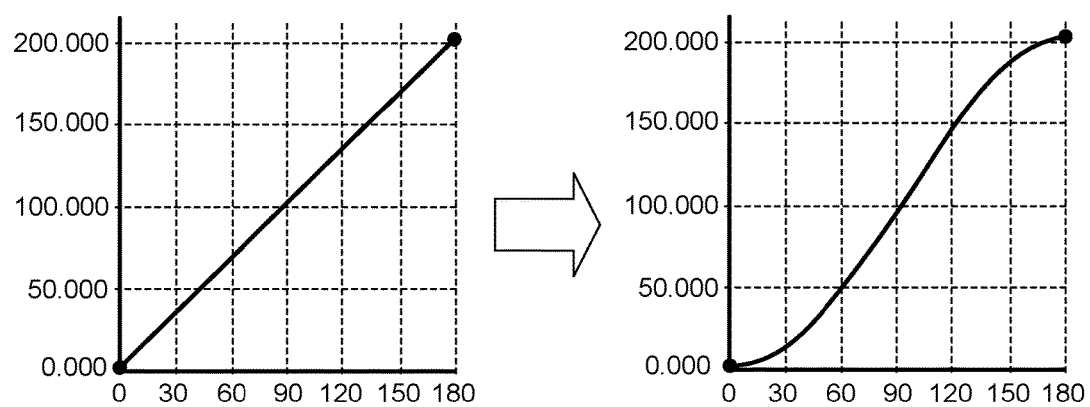
FIG. 4 illustrates examples of a motion curve of the slave axis which can be selected by a slave axis motion curve selection unit.
FIG. 5 illustrates an example of change of a moving speed of the slave axis from a constant speed to a speed of a simple harmonic motion by the slave axis motion curve selection unit.

FIG. 4 illustrates motion curves which can be selected by an operator. Further, FIG. 5 illustrates change of a moving speed of the slave axis in a case where an operator changes a motion curve from a constant speed motion to a simple harmonic motion (motion in a sine curve) as an example. Such change of a motion curve in accordance with a motion state of the slave axis enables the slave axis to move within a range in which the slave axis does not exceed the allowable speed and the allowable acceleration.

The master teaching position adjustment unit 17 restores a position of the master axis to a position where the speed of the slave axis is within the allowable range, along a path from the preceding teaching point to the current teaching point. With this restoration, an operator can newly input a position of a teaching point. Here, the master teaching position adjustment unit 17 may take safety measures such as setting a torque limit and displaying a warning message before moving the master axis.

Figure 6:
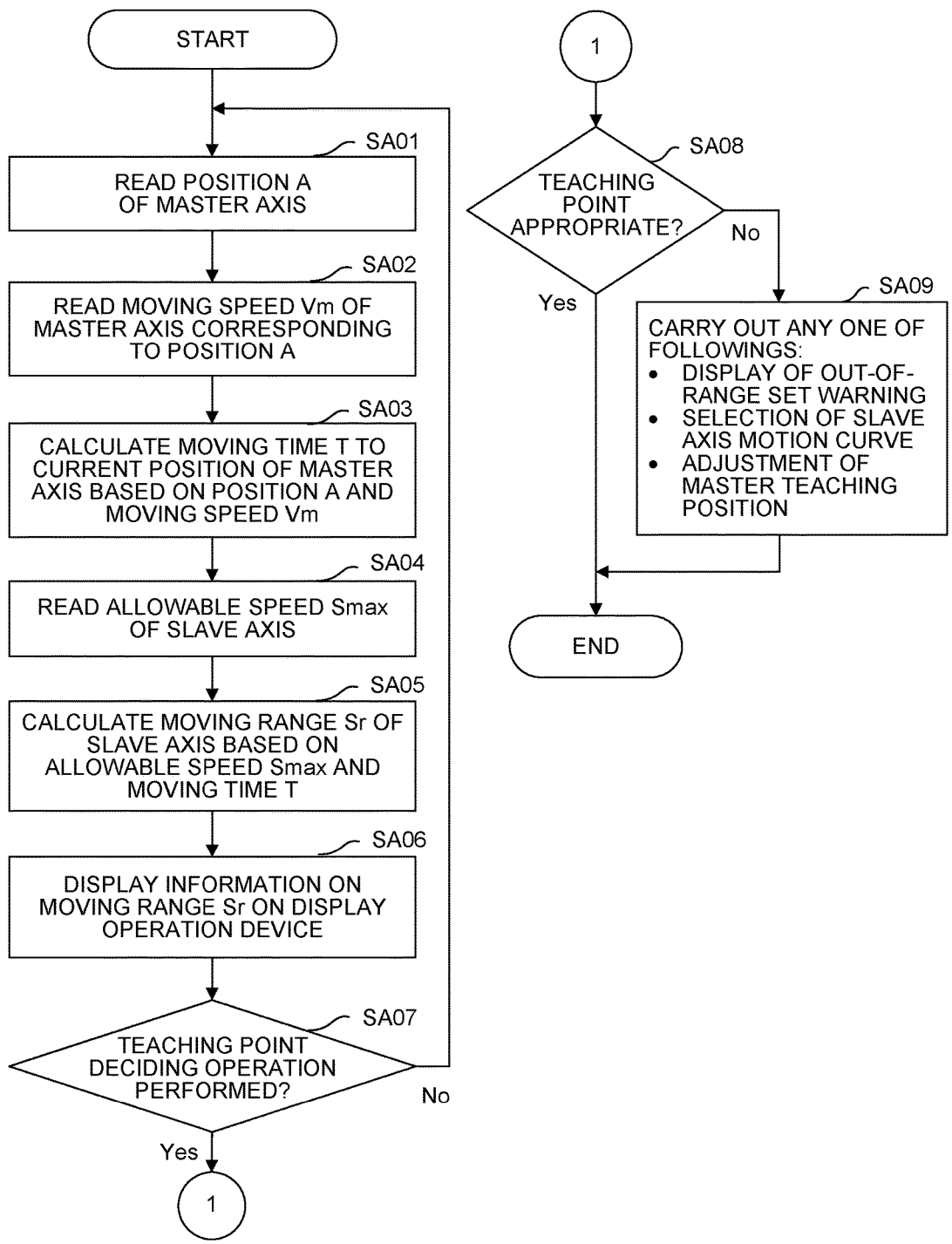
FIG. 6 is a flowchart illustrating a flow of processing executed on the controller of FIG. 1.

FIG. 6 is a flowchart illustrating a flow of processing related to a single time teaching operation with respect to the slave axis executed on the controller 1. The description will be given in line with each step of the flowchart

[Step SA01] The teaching point range calculation unit 12 reads a current position A of the master axis.

[Step SA02] The teaching point range calculation unit 12 reads, from a master axis moving speed pattern, a moving speed Vm of the master axis on a moving path from a position of the preceding teaching point of the master axis to the current position A.

[Step SA03] The teaching point range calculation unit 12 calculates moving time T from the position of the preceding teaching point of the master axis to the current position A of the master axis based on the current position A of the master axis and the moving speed Vm of the master axis on the moving path.

[Step SA04] The teaching point range calculation unit 12 reads an allowable speed Smax of the slave axis.

[Step SA05] The teaching point range calculation unit 12 calculates a moving range Sr of the slave axis based on the allowable speed Smax of the slave axis and the moving time T calculated in step SA03.

[Step SA06] The teaching point range information display unit 13 displays the moving range Sr of the slave axis which is calculated in step SA05 on the display operation device 2.

[Step SA07] The teaching setting position appropriateness confirmation unit 14 determines whether or not a deciding operation of the teaching point is performed after an operator carries out a teaching operation on the slave axis by operating the display operation device 2. In the case where the deciding operation of the teaching point is performed, the processing proceeds to step SA08. In the case where the deciding operation of the teaching point is not performed, the processing returns to step SA01.

[Step SA08] The teaching setting position appropriateness confirmation unit 14 determines whether or not the position of the teaching point of the slave axis which is determined through the operation of the display operation device 2 operated by an operator is within the moving range of the slave axis which is calculated in step SA05. In the case where the position is within the moving range of the slave axis, the processing is ended. In the case where the position is out of the moving range of the slave axis, the processing proceeds to step SA09.

[Step SA09] In accordance with setting or an operation by an operator, any one of out-of-range set warning display processing by the out-of-range set warning display unit 15, slave axis motion curve selection processing by the slave axis motion curve selection unit 16, and master teaching position adjustment processing by the master teaching position adjustment unit 17 is carried out and then, the processing is ended.

While embodiments of the present invention have been described above, the present invention is not limited only to the above-described examples of embodiments, but can be carried out in various aspects by making appropriate modifications thereto.

For example, the controller 1 may be configured such that the teaching point range calculation unit stores current positions of the master axis and the slave axis in a memory which is backed up by a battery (not shown) when the controller 1 is turned off in the middle of a teaching operation of a teaching point and the teaching operation can be carried out from the halt point of the operation when the controller 1 is turned on again.

Further, information such as an interference danger range may be preliminarily acquired from a machine which is a teaching object so as to use the information in determining the appropriateness of a teaching point of the slave axis, which is set by an operator, by means of the teaching setting position appropriateness confirmation unit.

Figures 7, 8:
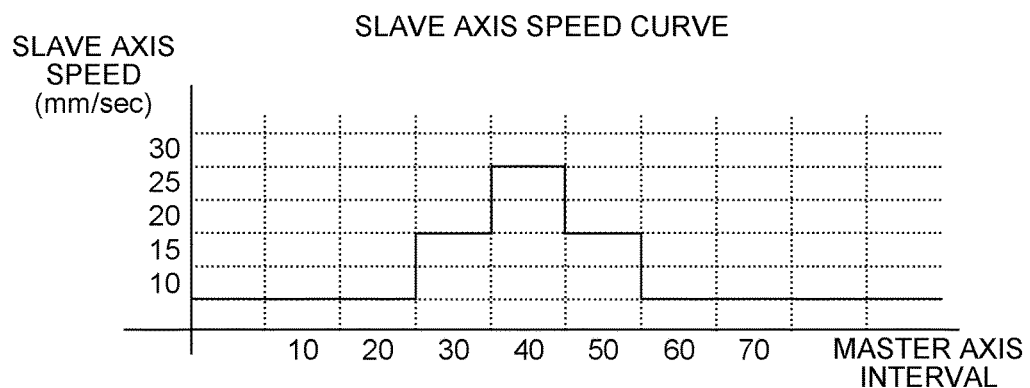
FIG. 7 illustrates data of combinations among ranges of a master axis position and slave axis positions in cases where interference occurs.
FIG. 8 illustrates a registration example of a motion curve corresponding to a slave axis allowable speed pattern.

For example, as shown in FIG. 7, data representing combinations of ranges of a master axis position and slave axis positions for respective cases where interference occurs may be preliminarily registered on the memory of the controller. In a case where a master axis position and slave axis positions of a teaching point correspond to any one of the combinations of ranges of these axes positions in interference cases, it may be determined that the taught axes positions are in the interference danger range and it may be determined that the teaching position is not appropriate in step SA08 in the flowchart of FIG. 6, thereby executing the processing in step SA09.

Further, an interlock may be applied to an axial movement of the slave axis when an operator is about to move the slave axis to the outside of a stroke range which is calculated by the teaching point range calculation unit 12, so as to prevent the slave axis from moving to a region outside the stroke range.

Further, such configuration may be employed that an operator can newly register types of motion curves which can be selected by the slave axis motion curve selection unit 16 other than the motion curves shown in FIG. 4. For example, a type of a motion curve may be newly set and registered in advance in accordance with a slave axis allowable speed pattern as shown in FIG. 8.

The invention claimed is:

1. A controller which teaches a teaching point of one or more slave axes corresponding to a master axis so as to perform a synchronous operation, the controller comprising:
a master axis moving speed pattern selection unit that selects a moving speed pattern of the master axis that is preliminarily registered;
a slave axis allowable speed setting unit that preliminarily sets an allowable speed in an operation of the slave axis;
a teaching point range calculation unit that calculates a teaching range of a following teaching point in which teaching can be performed; and
a teaching point range information display unit that displays, on a display device, the teaching range calculated by the teaching point range calculation unit wherein the teaching point range calculation unit is configured to calculate the teaching range based on
(1) the moving speed pattern of the master axis that is selected by the master axis moving speed pattern selection unit,
(2) the allowable speed in an operation of the slave axis that is set by the slave axis allowable speed setting unit, and
positions of past teaching points of the master axis and the slave axis,
wherein, when the master axis moves at a constant speed, the teaching point range calculation unit is configured to
refer to the moving speed pattern of the master axis,
acquire a speed of the master axis from a position of a past teaching point to a position of a following teaching point, and
calculate moving time Tm of the master axis based on the acquired speed, by using Formula (1)

$$Tm=(2 \times Xm)/Fm \qquad (1)$$

where Xm is a moving amount of the master axis, and Fm is the speed of the master axis.

2. The controller according to claim 1, further comprising:
a teaching setting position appropriateness confirmation unit that determines whether or not a position of a teaching point of the slave axis that is set by an operator is within the teaching range calculated by the teaching point range calculation unit;
an out-of-range set warning display unit that displays a warning message when the teaching setting position appropriateness confirmation unit determines that a position of a teaching point of the slave axis is a position outside the teaching range;
a slave axis motion curve selection unit that is configured to change a shape of a motion curve of the slave axis when the teaching setting position appropriateness confirmation unit determines that the set position of the teaching point of the slave axis is a position outside the teaching range; and
a master teaching position adjustment unit that moves the master axis to a position where a speed of the slave axis is in an allowable range, when the teaching setting position appropriateness confirmation unit determines that the set position of the teaching point of the slave axis is a position outside the teaching range.

3. The controller according to claim 1, wherein the teaching point range calculation unit monitors a position of the master axis, and carries out calculation of the teaching range again when the master axis moves.

4. The controller according to claim 1, wherein the teaching point range calculation unit is configured to store positions of the master axis and the slave axis in a memory which is backed up by a battery even when the controller is turned off in a middle of an operation, so as to enable teaching operation to be carried out from a halt point when the controller is turned on again.

5. The controller according to claim 2, wherein the teaching setting position appropriateness confirmation unit uses an interference danger range of the master axis and the slave axis in determination of whether or not to be in a range represented by the teaching range.

6. The controller according to claim 2, wherein the out-of-range set warning display unit is configured to display a warning message and also interlock movements of the master axis and the slave axis to prevent the axes from moving.

7. The controller according to claim 2, wherein the slave axis motion curve selection unit is configured to newly set a type of a motion curve which is selectable.

8. The controller according to claim 2, wherein the master teaching position adjustment unit is configured to apply a torque limit to the master axis or display a warning message when moving the master axis.

9. The controller according to claim 1, wherein the teaching point range calculation unit is configured to
refer to the moving speed pattern of the master axis,
acquire a speed of the master axis from a position of a past teaching point to a position of a following teaching point,
calculate moving time of the master axis based on the acquired speed, and
calculate, based on the calculated moving time, a range of a position of a teaching point in which the slave axis does not exceed an allowable speed and an allowable acceleration rate set in a slave axis allowable speed pattern.

10. The controller according to claim 1, wherein
the teaching point range calculation unit is configured to calculate, based on the calculated moving time Tm, a range of a position of a teaching point in which the slave axis does not exceed an allowable speed and an allowable acceleration rate set in a slave axis allowable speed pattern, by using Formula (2)

$$Xs \leq Fs_{max} \times Tm \quad (2)$$

where Xs is a moving amount of the slave axis, Fs is a speed of the slave axis, and $Fs_{max}$ is a maximum allowable speed of the slave axis.

11. A controller which teaches a teaching point of one or more slave axes corresponding to a master axis so as to perform a synchronous operation, the controller comprising:
a master axis moving speed pattern selection unit that selects a moving speed pattern of the master axis that is preliminarily registered;
a slave axis allowable speed setting unit that preliminarily sets an allowable speed in an operation of the slave axis;
a teaching point range calculation unit that calculates a teaching range of a following teaching point in which teaching can be performed; and
a teaching point range information display unit that displays, on a display device, the teaching range calculated by the teaching point range calculation unit wherein
the teaching point range calculation unit is configured to calculate the teaching range based on
(1) the moving speed pattern of the master axis that is selected by the master axis moving speed pattern selection unit,
(2) the allowable speed in an operation of the slave axis that is set by the slave axis allowable speed setting unit, and positions of past teaching points of the master axis and the slave axis,
wherein when the master axis moves at a constant speed in a circular motion, the teaching point range calculation unit is configured to
calculate moving time Tm of the master axis, by using Formula (3)

$$Tm = \sqrt{\frac{6Xm}{Aa}} \quad (3)$$

where Xm is a moving amount of the master axis, Tm is moving time of the master axis, and Aa is an acceleration rate of master axis.

12. The controller according to claim 11, wherein
the teaching point range calculation unit is configured to calculate a range of a position of a teaching point within the allowable speed and an allowable acceleration rate of the master axis based on the moving time of the master axis, by using Formula (4)

$$Xs \leq Fs_{max} \times Tm \quad (4)$$

where Xs is a moving amount of the slave axis, Fs is a speed of the slave axis, and $Fs_{max}$ is a maximum allowable speed of the slave axis.

13. The controller according to claim 11, further comprising:
a teaching setting position appropriateness confirmation unit that determines whether or not a position of a teaching point of the slave axis that is set by an operator is within the teaching range calculated by the teaching point range calculation unit;
an out-of-range set warning display unit that displays a warning message when the teaching setting position appropriateness confirmation unit determines that a position of a teaching point of the slave axis is a position outside the teaching range;
a slave axis motion curve selection unit that is configured to change a shape of a motion curve of the slave axis when the teaching setting position appropriateness confirmation unit determines that the set position of the teaching point of the slave axis is a position outside the teaching range; and
a master teaching position adjustment unit that moves the master axis to a position where a speed of the slave axis is in an allowable range, when the teaching setting position appropriateness confirmation unit determines that the set position of the teaching point of the slave axis is a position outside the teaching range.

14. The controller according to claim 11, wherein the teaching point range calculation unit monitors a position of the master axis, and carries out calculation of the teaching range again when the master axis moves.

15. The controller according to claim 11, wherein the teaching point range calculation unit is configured to store positions of the master axis and the slave axis in a memory which is backed up by a battery even when the controller is turned off in a middle of an operation, so as to enable teaching operation to be carried out from a halt point when the controller is turned on again.

16. The controller according to claim 13, wherein the teaching setting position appropriateness confirmation unit uses an interference danger range of the master axis and the slave axis in determination of whether or not to be in a range represented by the teaching range.

17. The controller according to claim 13, wherein the out-of-range set warning display unit is configured to display a warning message and also interlock movements of the master axis and the slave axis to prevent the axes from moving.

18. The controller according to claim 13, wherein the slave axis motion curve selection unit is configured to newly set a type of a motion curve which is selectable.

19. The controller according to claim 13, wherein the master teaching position adjustment unit is configured to apply a torque limit to the master axis or display a warning message when moving the master axis.

20. The controller according to claim 11, wherein the teaching point range calculation unit is configured to
- refer to the moving speed pattern of the master axis,
- acquire a speed of the master axis from a position of a past teaching point to a position of a following teaching point,
- calculate moving time of the master axis based on the acquired speed, and
- calculate, based on the calculated moving time, a range of a position of a teaching point in which the slave axis does not exceed an allowable speed and an allowable acceleration rate set in a slave axis allowable speed pattern.

\* \* \* \* \*